(12) United States Patent
Berliner et al.

(10) Patent No.: US 8,249,334 B2
(45) Date of Patent: Aug. 21, 2012

(54) MODELING OF HUMANOID FORMS FROM DEPTH MAPS

(75) Inventors: Tamir Berliner, Beitr Hashmonay (IL); Ziv Hendel, Herzlia (IL); Alexander Shpunt, Petah-tikva (IL); Jeffrey Danowitz, Tel Aviv (IL); Dmitri Rais, Ramat-gan (IL); Oren Mor, Tel Aviv (IL); Michael Shpigelmacher, New York, NY (US)

(73) Assignee: Primesense Ltd., Tel Aviv (IL)

( * ) Notice: Subject to any disclaimer, the term of this patent is extended or adjusted under 35 U.S.C. 154(b) by 563 days.

(21) Appl. No.: 12/300,086

(22) PCT Filed: May 10, 2007

(86) PCT No.: PCT/IL2007/000574
§ 371 (c)(1),
(2), (4) Date: Oct. 8, 2009

(87) PCT Pub. No.: WO2007/132451
PCT Pub. Date: Nov. 22, 2007

(65) Prior Publication Data
US 2010/0034457 A1    Feb. 11, 2010

Related U.S. Application Data

(60) Provisional application No. 60/799,952, filed on May 11, 2006.

(51) Int. Cl.
*G06K 9/00* (2006.01)
(52) U.S. Cl. ........ 382/154; 382/103; 382/106; 382/107; 345/419

(58) Field of Classification Search .................. 382/154, 382/103, 106, 107; 345/419; 356/511, 35.5
See application file for complete search history.

(56) References Cited

U.S. PATENT DOCUMENTS 5,846,134 A    12/1998    Latypov
5,852,672 A    12/1998    Lu
(Continued)

FOREIGN PATENT DOCUMENTS
JP    H03-029806 A    2/1991
(Continued)

OTHER PUBLICATIONS

Hart, D., U.S. Appl. No. 09/616,606 "Method and System for High Resolution , Ultra Fast 3-D Imaging", filed Jul. 14, 2000.

(Continued)

*Primary Examiner* — Matthew Bella
*Assistant Examiner* — Ruiping Li
(74) *Attorney, Agent, or Firm* — Blakely, Sokoloff, Taylor & Zafman

(57) ABSTRACT

A computer-implemented method includes receiving a depth map (30) of a scene containing a body of a humanoid subject (28). The depth map includes a matrix of pixels (32), each corresponding to a respective location in the scene and having a respective pixel value indicative of a distance from a reference location to the respective location. The depth map is segmented so as to find a contour (64) of the body. The contour is processed in order to identify a torso (70) and one or more limbs (76, 78, 80, 82) of the subject. An input is generated to control an application program running on a computer by analyzing a disposition of at least one of the identified limbs in the depth map.

36 Claims, 8 Drawing Sheets

U.S. PATENT DOCUMENTS

| | | | |
|---|---|---|---|
| 5,862,256 | A | 1/1999 | Zetts et al. |
| 5,864,635 | A | 1/1999 | Zetts et al. |
| 5,870,196 | A | 2/1999 | Lulli et al. |
| 6,002,808 | A | 12/1999 | Freeman |
| 6,256,033 | B1 | 7/2001 | Nguyen |
| 6,681,031 | B2 | 1/2004 | Cohen et al. |
| 6,857,746 | B2 | 2/2005 | Dyner |
| 7,003,134 | B1 | 2/2006 | Covell et al. |
| 7,013,046 | B2 | 3/2006 | Kawamura et al. |
| 7,042,440 | B2 | 5/2006 | Pryor et al. |
| 7,170,492 | B2 | 1/2007 | Bell |
| 7,215,815 | B2 | 5/2007 | Honda |
| 7,259,747 | B2 | 8/2007 | Bell |
| 7,302,099 | B2 | 11/2007 | Zhang et al. |
| 7,340,077 | B2 | 3/2008 | Gokturk |
| 7,348,963 | B2 | 3/2008 | Bell |
| 7,428,542 | B1 | 9/2008 | Fink et al. |
| 7,536,032 | B2 | 5/2009 | Bell |
| 7,580,572 | B2 | 8/2009 | Bang et al. |
| 2002/0071607 | A1 | 6/2002 | Kawamura et al. |
| 2003/0095698 | A1 | 5/2003 | Kawano |
| 2003/0156756 | A1 | 8/2003 | Gokrurk et al. |
| 2003/0235341 | A1 | 12/2003 | Gokurk et al. |
| 2004/0091153 | A1* | 5/2004 | Nakano et al. ............ 382/228 |
| 2004/0183775 | A1 | 9/2004 | Bell |
| 2004/0184640 | A1 | 9/2004 | Bang et al. |
| 2004/0184659 | A1 | 9/2004 | Bang et al. |
| 2005/0031166 | A1 | 2/2005 | Fujimara et al. |
| 2005/0088407 | A1 | 4/2005 | Bell et al. |
| 2005/0089194 | A1 | 4/2005 | Bell |
| 2005/0265583 | A1 | 12/2005 | Covell et al. |
| 2006/0092138 | A1 | 5/2006 | Kim et al. |
| 2006/0115155 | A1 | 6/2006 | Lui et al. |
| 2006/0159344 | A1 | 7/2006 | Shao et al. |
| 2007/0154116 | A1 | 7/2007 | Shieh |
| 2007/0230789 | A1 | 10/2007 | Chang et al. |
| 2008/0123940 | A1 | 5/2008 | Kundu et al. |
| 2008/0236902 | A1 | 10/2008 | Imaizumi |
| 2008/0252596 | A1 | 10/2008 | Bell et al. |
| 2008/0260250 | A1 | 10/2008 | Vardi |
| 2009/0009593 | A1 | 1/2009 | Cameron et al. |
| 2009/0027335 | A1 | 1/2009 | Ye |
| 2009/0078473 | A1 | 3/2009 | Overgard et al. |
| 2009/0083622 | A1 | 3/2009 | Chien et al. |
| 2009/0096783 | A1 | 4/2009 | Shpunt et al. |
| 2009/0183125 | A1 | 7/2009 | Magal et al. |
| 2009/0297028 | A1 | 12/2009 | De Haan |
| 2010/0002936 | A1 | 1/2010 | Khomo et al. |
| 2010/0007717 | A1 | 1/2010 | Spektor et al. |
| 2010/0034457 | A1 | 2/2010 | Berliner et al. |
| 2010/0235786 | A1 | 9/2010 | Maizels et al. |
| 2011/0052006 | A1 | 3/2011 | Gurman et al. |
| 2011/0211754 | A1 | 9/2011 | Litvak et al. |
| 2011/0292036 | A1 | 12/2011 | Sali et al. |
| 2011/0293137 | A1 | 12/2011 | Gurman et al. |
| 2012/0070070 | A1 | 3/2012 | Litvak |

FOREIGN PATENT DOCUMENTS

| | | |
|---|---|---|
| JP | H10-235584 A | 9/1998 |
| WO | 9935633 A2 | 7/1999 |
| WO | 2003071410 A2 | 8/2003 |
| WO | 2004107272 A1 | 12/2004 |
| WO | 2005003948 A1 | 1/2005 |
| WO | 2005094958 A2 | 10/2005 |
| WO | 2007043036 A1 | 4/2007 |
| WO | 2007078639 A2 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2010004542 A1 | 1/2010 |

OTHER PUBLICATIONS

International Application PCT/IL2007/000306 Search Report dated Oct. 2, 2008.
International Application PCT/IL2007/000306 Preliminary Report on Patentability dated Mar. 19, 2009.
International Application PCT/IL2006/000335 Preliminary Report on Patentability dated Apr. 24, 2008.
Avidan et al., "Trajectory triangulation: 3D reconstruction of moving points from amonocular image sequence", PAMI, 22, 348-3537 (2000).
Leclerc et al., "The direct computation of height from shading", CVPR, 552-558 (1991).
Zhang et al., "Shape from intensity gradient", SMC-A, 29,318 (1999).
Zhang et al., "Height recovery from intensity gradients", CVPR, 508-513 (1994).
Horn, B., "Height and gradient from shading", IJCV, 5, 37-76 (1990).
Bruckstein, A., "On shape from shading", CVGIP, 44, 139-154 (1988).
Zhang et al., "Rapid Shape Acquisition Using Color Structured Light and Multi-Pass Dynamic Programming", 1st International Symposium on 3D Data Processing Visualization and Transmission (3DPVT), Jul. 2002, Padova, Italy.
Besl, P., "Active Optical Range Imaging Sensors", Machine vision and applications, 1, 127-152 (1988).
Horn et al., "Toward optimal structured light patterns", Proceedings of International Conference on Recent Advances in 3D Digital Imaging and Modeling, 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on PAMI, vol. 10, No. 5 (1988).
Winkelbach et al., "Shape from Single Stripe Pattern Illumination", Luc Van Gool (Editor), (DAGM 2002) Patter Recognition, Lecture Notes in Computer Science 2449, Springer 2002, p. 240-247.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, Springer 2002, pp. 557-565.
Kimmel et al., Analyzing and synthesizing images by evolving curves with the Osher-Sethian method, International Journal of Computer Vision, 24(1), 37-56 (1997).
Zigelman et al., "Texture mapping using surface flattening via multi-dimensional scaling", IEEE Transactions on Visualization and Computer Graphics, 8 (2), 198-207 (2002).
Dainty, J.C., "Introduction", Laser Speckle and Related Phenomena, pp. 1-7, Springer-Verlag, Berlin Heidelberg, 1975.
Mendlovic, et al., "Composite harmonic filters for scale, projection and shift invariant pattern recognition", Appl. Opt. 34, 310-316 (1995).
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, IPT 2004, Iowa State University.
Howe et al., "Bayesian Reconstruction of 3D Human Motion from Single-Camera Video", Advanced in Neural Information Processing Systems 12, Denver, Colorado 1999.
Li et al., "Real-Time 3D Motion Recognition with Dense Depth Map", Report CPSC525, Department of Computer Science, University of British Columbia, Vancouver BC 2004.
Grammalidis et al., "3-D Human Body Tracking from Depth Images Using Analysis by Synthesis", Proceedings of the IEEE International Conference on Image Processing (ICIP2001), Thessaloniki, Greece, pp. 185-188.
International Application PCT/IL2007/000574 Search Report dated Sep. 10, 2008.
International Application PCT/IL2007/000574 Patentability Report dated Mar. 19, 2009.
Li et al., "Real-Time 3D Motion Tracking with Known Geometric Models", Real-Time Imaging Journal, vol. 5, pp. 167-187, Academic Press 1999.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.

Shadmi, A., U.S. Appl. No. 12/683,452 "Three-Dimensional User Interface", filed Jan. 7, 2010.
Litvak et al., U.S. Appl. No. 61/308,996 "Detection, Segmentation and Tracking of Hands by Fusion of Color and Depth Video Streams", filed Mar. 1, 2010.
Meizels et al., U.S. Appl. No. 12/721,582 "Enhanced 3D Interfacing for Remote Devices", filed Mar 11, 2010.
Sali, E., U.S. Appl. No. 61/223,502 "Gesture Recognition Method & System", filed Aug. 13, 2009.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Nam et al., "Recognition of Hand Gestures with 3D, Nonlinear Arm Movements", Pattern Recognition Letters, vol. 18, No. 1, pp. 105-113, Elsevier Science B.V. 1997.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Ascension Technology Corporation, "Flock of Birds: Real-Time Motion Tracking", 2008.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
U.S. Appl. No. 61/429,767, filed Jan. 5, 2011.
Comaniciu et al., "Mean Shift: A Robust Approach Toward Feature Space Analysis", IEEE Transactions on Pattern Analysis and Machine Intelligence, vol. 24, No. 4, pp. 603-619, May 2002.
Datar et al., "Locality-Sensitive Hashing Scheme Based on p-Stable Distributions", Proceedings of the Symposium on Computational Geometry, pp. 253-262, Brooklyn, USA, Jun. 9-11, 2004.
U.S. Appl. No. 12/854,187, filed Aug. 11, 2010.
U.S. Appl. No. 61/349,894, filed May 31, 2010.
U.S. Appl. No. 61/383,342, filed Sep. 16, 2010.
Gionis et al., "Similarity Search in High Dimensions via Hashing", Proceedings of the 25th Very Large Database (VLDB) Conference, Edinburgh, UK, Sep. 7-10, 1999.
Bleiweiss et al., "Markerless Motion Capture Using a Single Depth Sensor", SIGGRAPH Asia 2009, Yokohama, Japan, Dec. 16-19, 2009.
Softkinetic S.A., "3D Gesture Recognition Platform for Developers of 3D Applications", Product Datasheet, IISU™, www.softkinetic-optrima.com, Belgium, 2007-2010.
Gesturetek Inc., Consumer Electronics Solutions, "Gesture Control Solutions for Consumer Devices", www.gesturetek.com, Toronto, Ontario, Canada, 2009.
Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.
Primesense Inc., "Prime Sensor™ NITE 1.1 Framework Programmer's Guide", Version 1.2, 2009.
Luxand Inc., "Luxand FaceSDK 3.0 Face Detection and Recognition Library Developer's Guide", years 2005-2010.
Intel Corporation, "Open Source Computer Vision Library Reference Manual", years 1999-2001.
Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.
Muja et al., "Fast Approximate Nearest Neighbors with Automatic Algorithm Configuration", International Conference on Computer Vision Theory and Applications, pp. 331-340, Lisboa, Portugal, Feb. 5-8, 2009.
Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.
Agarwal et al., "Monocular Human Motion Capture with a Mixture of Regressors", Proceedings of the 2004 IEEE Conference on Computer Vision and Pattern Recognition, San Diego, USA, Jun. 20-26, 2005.
Lv et al., "Single View Human Action Recognition Using Key Pose Matching and Viterbi Path Searching", Proceedings of IEEE Conference on Computer Vision and Pattern Recognition, Minneapolis, USA, Jun. 17-22, 2007.
Ramanan et al., "Training Deformable Models for Localization", Proceedings of the 2006 IEEE Conference on Computer Vision and Pattern Recognition, pp. 206-213, New York, USA, Jun. 17-22, 2006.
Japanese Patent Application # 2009508667 Official Action dated Nov. 24, 2011.
Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.
U.S. Appl. No. 61/609,386, filed Mar. 12, 2012.
Rodgers et al., "Object Pose Detection in Range Scan Data", IEEE Conference on Computer Vision and Pattern Recognition, pp. 2445-2452, New York, USA, Jun. 17-22, 2006.
Shotton et al., "Real-Time Human Pose Recognition in Parts from Single Depth Images", 24th IEEE Conference on Computer Vision and Pattern Recognition, Colorado Springs, USA, Jun. 20-25, 2011.
Jiang, H., "Human Pose Estimation Using Consistent Max-Covering", 12th IEEE International Conference on Computer Vision, Kyoto, Japan, Sep. 27-Oct. 4, 2009.
Ramanan, D., "Learning to Parse Images of Articulated Bodies", Neural Information Processing Systems Foundation year 2006.
Munoz-Salinas et al., "People Detection and Tracking Using Stereo Vision and Color", Image and Vision Computing, vol. 25, No. 6, pp. 995-1007, Jun. 1, 2007.
Bradski, G., "Computer Vision Face Tracking for Use in a Perceptual User Interface", Intel Technology Journal, vol. 2, issue 2 (2nd Quarter 2008).
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.
Shi et al., "Good Features to Track", IEEE Conference on Computer Vision and Pattern Recognition, pp. 593-600, Seattle, USA, Jun. 21-23, 1994.
Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.
Submuth et al., "Ridge Based Curve and Surface Reconstruction", Eurographics Symposium on Geometry Processing, Barcelona, Spain, Jul. 4-6, 2007.
Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.
Cohen et al., "Interference of Human Postures by Classification of 3D Human Body Shape", IEEE International Workshop on Analysis and Modeling of Faces and Gestures, ICCV 2003, Nice, France, Oct. 14-17, 2003.
Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.
Borenstein et al., "Combining Top-down and Bottom-up Segmentation", Proceedings of the IEEE Conference on Computer Vision and Pattern Recognition, Jun. 27-Jul. 2, 2004.
Karlinsky et al., "Combined Model for Detecting, Localizing, Interpreting and Recognizing Faces", Faces in Real-Life Images workshop, European Conference on Computer Vision, France, Oct. 12-18, 2008.
Ullman, S., "Object Recognition and Segmentation by a Fragment-Based Hierarchy", Trends in Cognitive Sciences, vol. 11, No. 2, pp. 58-64, Feb. 2007.
Chinese Patent Application # 200780013930 Official Action dated Nov. 17, 2011.
U.S. Appl. No. 13/229,727, filed Sep. 11, 2011.

* cited by examiner

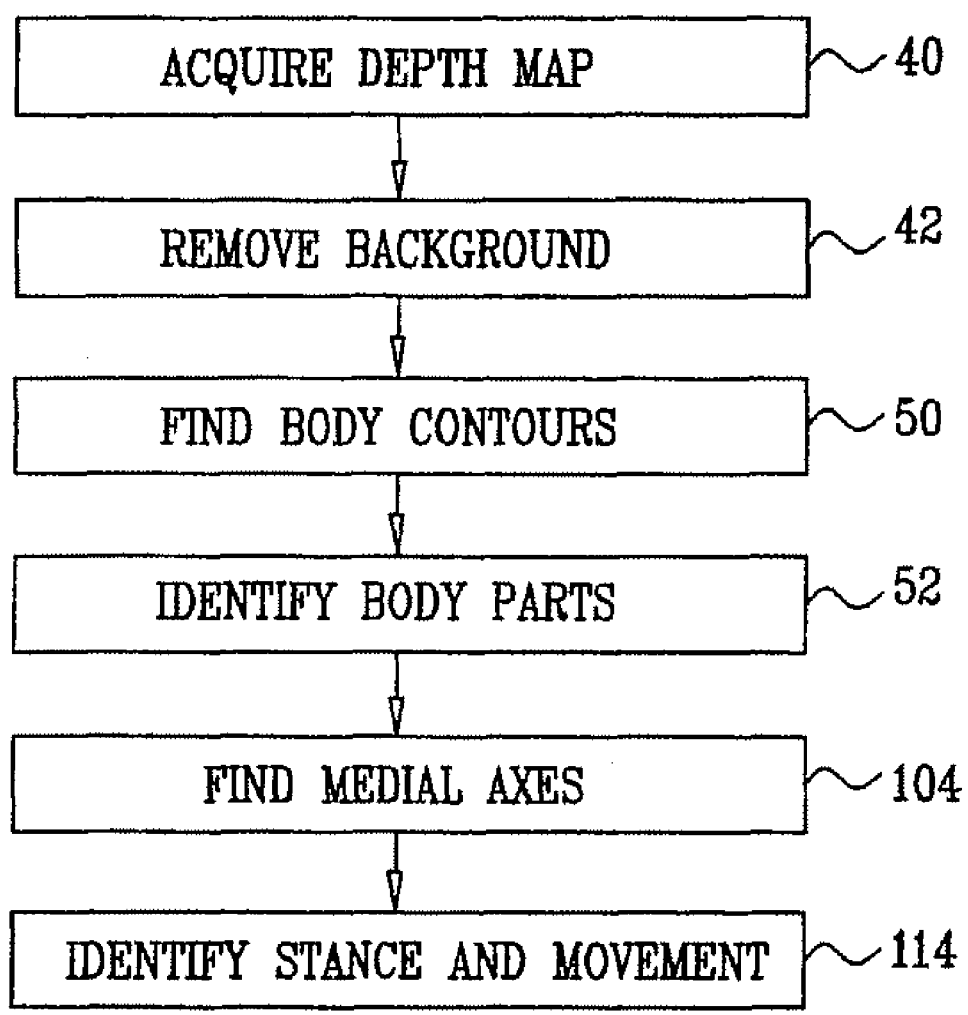

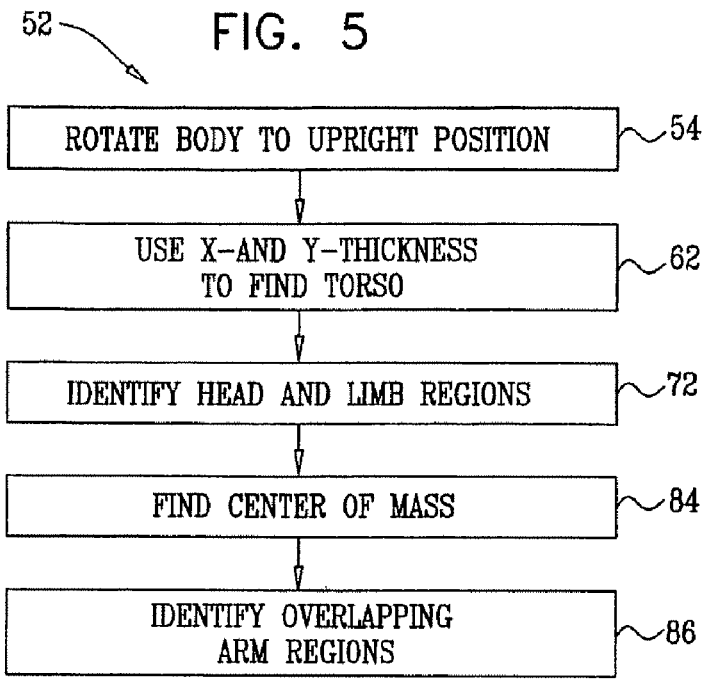
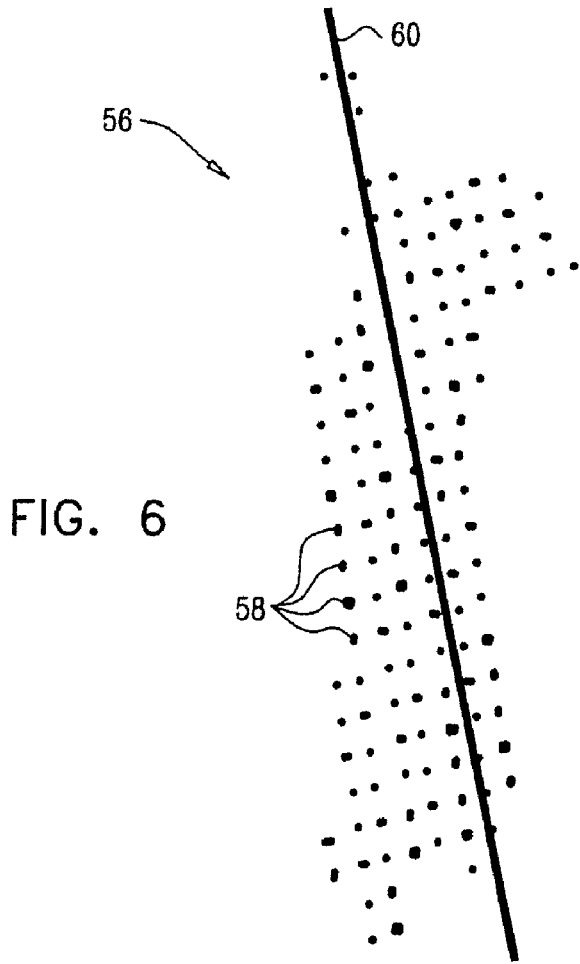

MODELING OF HUMANOID FORMS FROM DEPTH MAPS

This is a non-provisional application claiming the benefit of International application number PCT/IL2007/000574 filed May 10, 2007.

CROSS-REFERENCE TO RELATED APPLICATIONS

This application claims the benefit of U.S. Provisional Patent Application 60/799,952, filed May 11, 2006, which is incorporated herein by reference.

FIELD OF THE INVENTION

The present invention relates generally to methods and systems for mapping and modeling of three-dimensional (3D) objects, and specifically to automated extraction of humanoid forms from depth maps.

BACKGROUND OF THE INVENTION

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel value indicative of the distance from a certain reference location to the respective scene location. (In other words, the depth map has the form of an image in which the pixel values indicate topographical information, rather than brightness and/or color of the objects in the scene.) Depth maps may be created, for example, by detection and processing of an image of an object onto which a laser speckle pattern is projected, as described in PCT International Publication WO 2007/043036 A1, whose disclosure is incorporated herein by reference.

Various methods are known in the art for computerized three-dimensional (3D) modeling of human forms from video or other image data. Some of these methods require that dedicated markers be attached to the subject's body at known locations in order to facilitate tracking of the subject's motion. A marker-based method of this sort is described, for example, by Fua et al., in "Human Shape and Motion Recovery Using Animation Models," 19*th Congress, International Society for Photogrammetry and Remote Sensing* (Amsterdam, July, 2000), which is incorporated herein by reference.

Other methods use multiple cameras to provide 3D stereo image information, and process this information to model human (or other) forms. For example, Allard et al. describe such a method in "Marker-less Real Time 3D Modeling for Virtual Reality," *Immersive Projection Technology* (IPT 2004, Iowa State University), which is incorporated herein by reference. An alternative method, which applies a probabilistic model of human shape and motion to two-dimensional (2D) images, is described by Howe et al., in "Bayesian Reconstruction of 3D Human Motion from Single-Camera Video," *Advances in Neural Information Processing Systems* 12 (Denver, Colo., 1999), which is also incorporated herein by reference.

Li et al. describe the use of a "stereo camera" in providing depth information in "Real-time 3D Motion Recognition with Dense Depth Map," (Report CPSC525, Department of Computer Science, University of British Columbia, Vancouver, BC, 2004), which is incorporated herein by reference. A statistical background subtraction method is applied to the input video stream froth the stereo camera, and a correlation-based stereo method is used to give a dense depth map of the foreground object. An optical flow approach is then used to detect motion of the object based on the depth map.

Grammalidis et al. describe another depth-based method in "3-D Human Body Tracking from Depth Images Using Analysis by Synthesis," *Proceedings of the IEEE International Conference on Image Processing* (CIP 2001, Thessaloniki, Greece), pp. 185-188, which is incorporated herein by reference. The method is directed to estimating MPEG-4 Body Animation Parameters (BAPs) of a human arm. The rigid parts of the MPEG4 body model are initially scaled to the geometric properties of the corresponding body part, which is imaged by a camera. BAP values are then estimated using a technique based on the Downhill Simplex minimization method.

SUMMARY OF THE INVENTION

Embodiments of the present invention that are described hereinbelow provide methods, devices and software for modeling humanoid forms based on depth maps. (The term "humanoid," as used in the present patent application and in the claims, refers to any being whose body structure resembles that of a human.) In an exemplary embodiment, a processor segments a depth map of a scene containing a body of a subject so as to find a contour of the body. The processor then analyzes the contour in order to identify a torso and one or more limbs of the subject and to determine the disposition of at least one of the limbs.

The processor may evaluate the disposition of the limb (or limbs) over a single image or series of images in order to extract gestures and/or other motions of the subject. The resulting information may be used as an input to control an application program running on a computer. Alternatively, the processor may derive a static or moving model of the body, incorporating the disposition of the limbs and possibly the torso, for other purposes. The methods described hereinbelow for processing depth maps are very efficient, so that a conventional microprocessor may be programmed to carry out these methods in real-time, i.e., at a processing rate that is equal at least to standard video rates of 25-30 frames/sec.

There is therefore provided, in accordance with an embodiment of the present invention, a computer-implemented method for processing data, including:

receiving a depth map of a scene containing a body of a humanoid subject, the depth map including a matrix of pixels, each pixel corresponding to a respective location in the scene and having a respective pixel value indicative of a distance from a reference location to the respective location;

segmenting the depth map so as to find a contour of the body;

processing the contour in order to identify a torso and one or more limbs of the subject; and generating an input to control an application program running on a computer by analyzing a disposition of at least one of the identified limbs in the depth map.

Typically, receiving the depth map includes acquiring the depth map without affixing any dedicated marker to the body. In a disclosed embodiment, receiving the depth map includes acquiring the depth map using a single, stationary imaging device. Acquiring the depth map may include projecting an uncorrelated pattern of spots onto the subject, capturing an image of the projected pattern using the imaging device, and processing the image in order to generate the depth map. In one embodiment, projecting the uncorrelated pattern of spots includes forming a primary speckle pattern using a coherent light source.

In some embodiments, receiving the depth map includes acquiring a sequence of depth maps at a frame rate of at least 25 frames/sec, and generating the control input includes updating the control input, responsively to the sequence of depth maps, at an update rate that is equal at least to the frame rate.

Typically, segmenting the depth map includes identifying a background object in the scene that is not connected to the body, and removing the background object from the scene prior to finding the contour.

In some embodiments, processing the contour includes assessing a thickness of an area within the contour, identifying a first part of the area as the torso responsively to the thickness, and identifying a second part of the area that is connected to the torso as at least one of the limbs. In one embodiment, assessing the thickness includes identifying an axis of the body in the depth map, computing a transverse thickness of the contour along multiple first lines perpendicular to the axis, computing a longitudinal thickness of the contour along multiple second lines parallel to the axis, and designating as the torso a part of the area within the contour that is defined by the first and second lines along which the transverse thickness and longitudinal thickness are no less than a specified transverse threshold and longitudinal threshold, respectively. Additionally or alternatively, identifying the second part of the area includes determining, based on the depth map, a representative distance of the torso from the reference location, and identifying as an arm of the subject a region overlying the torso in which the distance of the pixels is less than the representative distance.

In a disclosed embodiment, analyzing the disposition includes finding one or more respective medial axes of the one or more limbs by iteratively removing the pixels from at least one of the limbs. Typically, the medial axes are curved, and analyzing the disposition includes deriving stick-figure representations of the one or more limbs by finding straight segments that fit the medial axes.

Typically, the one or more limbs comprise an arm of the subject, and the processor is configured to derive a stick-figure representation of the arm by identifying a shoulder point on the torso and a palm point on the arm, and identifying two straight segments that pass through the shoulder and palm points, respectively, and meet at an elbow of the arm.

There is also provided in accordance with an embodiment of the present invention, apparatus for processing data, including:

an imaging device, which is configured to capture an image of a scene containing a body of a humanoid subject; and a processor, which is coupled to process the image so as to create a depth map, which includes a matrix of pixels, each pixel corresponding to a respective location in the scene and having a respective pixel value indicative of a distance from a reference location to the respective location, and which is configured to segment the depth map so as to find a contour of the body, to process the contour in order to identify a torso and one or more limbs of the subject, and to generate an input to control an application program running on a computer by analyzing a disposition of at least one of the identified limbs in the depth map.

There is additionally provided, in accordance with an embodiment of the present invention, a computer software product, including a computer-readable medium in which program instructions are stored, which instructions, when read by a computer, cause the computer to acquire a depth map of a scene containing a body of a humanoid subject, the depth map including a matrix of pixels, each pixel corresponding to a respective location in the scene and having a respective pixel value indicative of a distance from a reference location to the respective location, and to segment the depth map so as to find a contour of the body, to process the contour in order to identify a torso and one or more limbs of the subject, and to generate an input to control an application program running on a computer by analyzing a disposition of at least one of the identified limbs in the depth map.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for modeling a human subject based on a depth map, in accordance with an embodiment of the present invention;

FIG. 5 is a flow chart that schematically shows details of a method for identifying body parts in a depth map, in accordance with an embodiment of the present invention;

FIG. 6 is a schematic representation of a down-sampled depth map in which a body axis is identified, in accordance with an embodiment of the present invention;

DETAILED DESCRIPTION OF EMBODIMENTS

Figure 1:
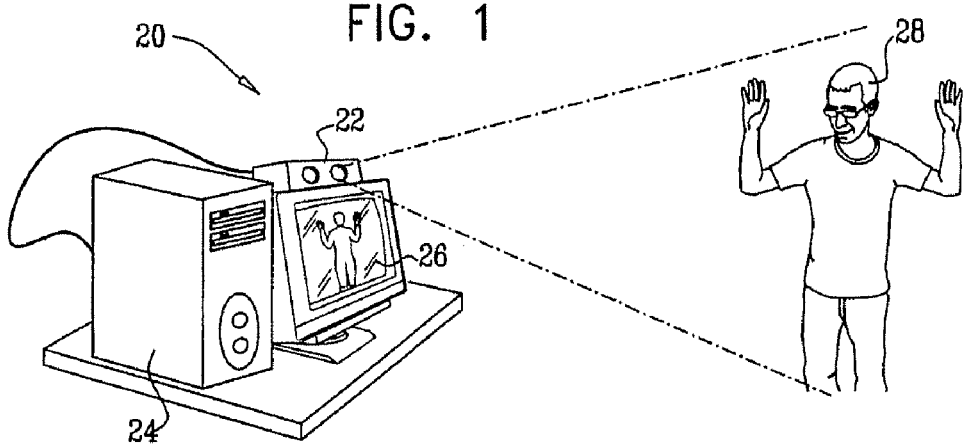
FIG. 1 is a schematic, pictorial illustration of a system for acquiring and processing depth maps, in accordance with an embodiment of the present invention.

FIG. 1 is a schematic, pictorial illustration of a system 20 for depth mapping and modeling, in accordance with an embodiment of the present invention. System 20 comprises an imaging device 22, which captures images of a scene containing a humanoid subject 28. An image processor 24 processes image data generated by device 22 in order to create a depth map of subject 28 and to create a model 26 of the subject based on the depth map, as is described in detail hereinbelow. The model typically comprises 3D information regarding the disposition of one or more of the subject's limbs. The methods described hereinbelow enable processor 24 to find the disposition of the subject's limbs from a single depth map, at real-time frame rates (at least 25 frames/sec), without reliance on previous frames. Additionally, the processor may also provide motion information as the subject changes his position over time.

Image processor 24 may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by a suitable processor or other dedicated circuitry within the housing of the imaging device or otherwise associated with the imaging device.

The principles of modeling that are described hereinbelow may be applied to any suitable sort of depth map of subject 28, created by substantially any type of mapping apparatus. For the sake of simplicity and low cost, however, it is advantageous that imaging device 22 comprise a single, stationary device, comprising a single image sensor. In one such embodiment, for example, device 22 generates and projects an uncorrelated pattern of spots onto subject 28 and captures an image of the spot pattern appearing on the object. The pattern is uncorrelated in the sense that the auto-correlation of the positions of the speckles in the pattern as a function of transverse shift is insignificant for any shift larger than the spot size. Random patterns, such as those created by primary speckle from a coherent light source, are uncorrelated in this sense.

The above-mentioned PCT International Publication WO 2007/043036 A1 describes this sort of speckle-based imaging and mapping device, as well as methods for depth mapping based on such a device. Further aspects of depth mapping using projected laser speckle are described in PCT Patent Application PCT/IL2007/000306, filed Mar. 8, 2007, which is assigned to the assignee of the present patent application and is incorporated herein by reference. As explained in these documents, the image processor detects transverse shifts of the speckles in the pattern relative to a known reference pattern. The shift of a given speckle is a function of the distance to the surface onto which the speckle is projected from the device.

The disposition and motion of the limbs of subject 28 that are determined by system 20 may be used as input to control an application program running on processor 24 or on another computer (not shown). For example, the processor may identify motions, such as gestures, made by the subject, and use these motions in an interactive interface between the subject and a computer game. Alternatively, the subject's stance and/or motion, as identified by system 20, may be used in controlling applications of other sorts, as well as in other areas of image processing and animation.

The derivation of depth maps from speckle images in system 20 is described above solely by way of example, in order to illustrate one typical sort of environment in which depth maps may be acquired and used. The principles of the present invention and the application of the methods described hereinbelow is in no way limited to this sort of system or this method of acquiring depth maps. Rather, these principles and methods may be applied to substantially any sort of depth map, which may be acquired using any suitable means and techniques that are known in the art.

Figure 2:
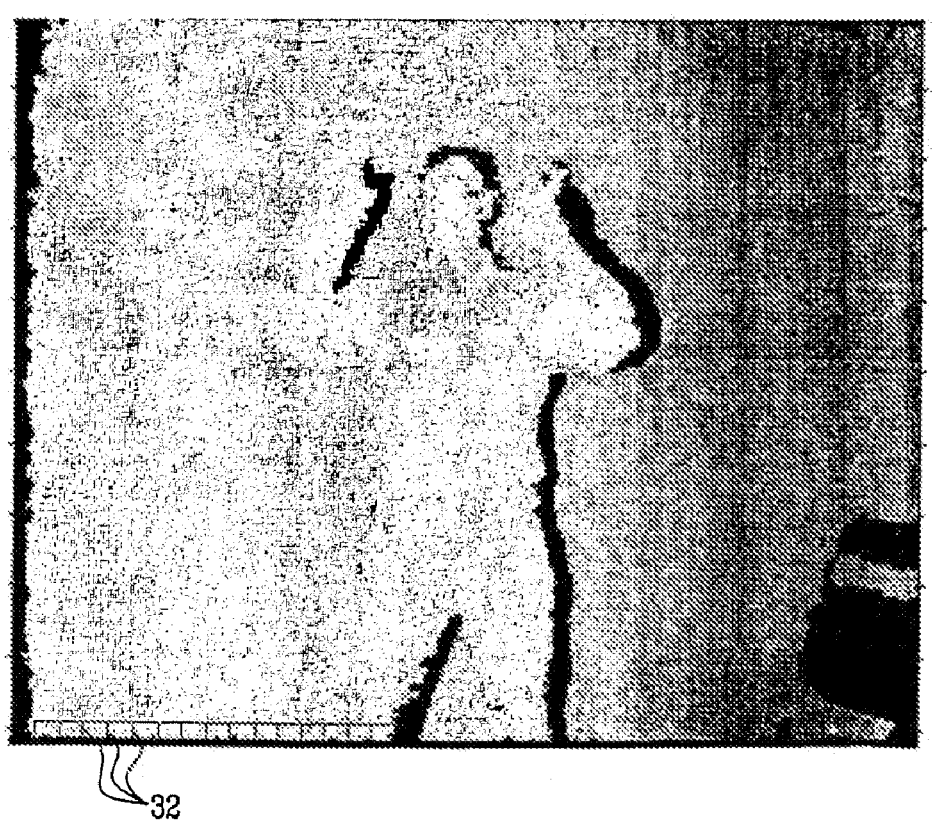
FIG. 2 is a schematic representation of a depth map, in accordance with an embodiment of the present invention.

FIG. 2 is a schematic representation of a depth map 30, in accordance with an embodiment of the present invention. The depth map comprises a two-dimensional matrix of pixels 32, each corresponding to a respective location in the scene. The value of each pixel (indicated by a gray-scale value in this figure) is indicative of the distance of the respective location in the scene from a reference location. For example, the pixel values may indicate the distances (i.e., the depths) of the points on the body of subject 28 from the image plane of device 22.

In practical applications, when subject 28 is allowed to move freely against a more distant background, not all the pixels of depth map will contain valid depth data. Rather, assuming device 22 is set to acquire depth information in a certain distance range (in which subject 28 is typically located), pixels corresponding to areas whose depth is outside the range may contain a predetermined null value, indicating that no depth could be found for these pixels. Other pixels may have a value classifying them as areas of shadow, meaning that there appears to be an object surface within the distance range at the location corresponding to the pixel, but the depth value for the pixel could not be determined. The value of these shadow pixels is also treated as a null value in the method described below, although in an alternative embodiment, different treatment may be applied to the shadow pixels.

FIG. 3 is a flow chart that schematically illustrates a method for modeling a humanoid subject based on a depth map, in accordance with an embodiment of the present invention. Processor 24 acquires the depth map, at a map acquisition step 40. The map may be acquired using system 20, as shown in FIG. 1, or alternatively using any other suitable type of depth mapping system that is known in the art. A key step in modeling the subject is to segment the depth map so as to define the parts of the subject's body. In preparation for segmenting the body, however, it is useful for the processor first to remove background objects from the scene, at a background removal step 42. If there are two or more humanoids in the scene, it is also useful to separate the respective bodies before proceeding to segment each one.

A number of different methods of background removal may be used at step 42. Some of these methods depend on making a preliminary identification of a blob (i.e., a connected group of pixels having similar values) in the depth map as the subject's body, and then removing other blobs having significantly different depth values from this blob. The blob that is preliminarily identified in this manner must typically be of a certain minimum size. For this purpose, however, the simple Euclidian distance between pixel coordinates at the edges of the blob does not give an accurate measure of the size. The reason for this inaccuracy is that the size of a blob, in pixels, corresponding to an object of a given actual size increases and decreases with the distance of the object from device 22 (see FIG. 1).

Therefore, to determine the actual size of an object, the (x, y, depth) coordinates of the object are first transformed into "real-world" coordinates (xr, yr, depth), using the following formulas:

$$xr=(x-fovx/2)*\text{pixel\_size}*\text{depth}/\text{reference\_depth}$$

$$yr=(y-fovy/2)*\text{pixel\_size}*\text{depth}/\text{reference\_depth}$$

Here fovx and fovy are the field of view (in pixels) of the depth map in the x and y directions. The pixel_size is the length subtended by a pixel at a given distance, reference_depth, from the mapping device. The size of a blob may then be determined realistically by taking the Euclidean distance between the real-world coordinates of the edges of the blob.

Processor 24 may carry out step 42 by identifying a blob of the required minimum size that has the smallest average depth value among the blobs in the scene. It can be assumed that this blob, which is nearest to device 22, is the body of subject 28. All pixels having depths greater than this average depth value by at least a certain threshold are assumed to belong to background objects, and the processor therefore resets the depths of these pixels to a null value. The threshold may be determined heuristically, in order to provide the optimal tradeoff between artifact-free modeling (without interference from background objects) and flexibility (in terms of the range of depths over which the subject is permitted to move). Additionally or alternatively, pixels having depth values that are significantly less than the average depth value of the blob may similarly be nulled.

Alternatively or additionally, a maximum depth for system 20 may be predefined by setting an appropriate parameter in the operating software. Processor 24 is programmed to ignore objects beyond this preset maximum depth. When subject 28 initiates the operation of system 20, he may view the actual depth map (or the resulting model 26) on a monitor that is connected to processor 24, and may thus position himself so that only he is in the scene and is captured by the system at an appropriate size.

As another alternative, a static depth filter may be created by first capturing an initial depth map of the scene without subject 28. A certain pixel or group of pixels may be identified (either interactively by the user or automatically by processor 24) on the background object that is closest to device 22. Processor 24 records the depth value of this pixel or group of pixels, and subsequently, at step 42, nulls the depth values of all pixels in the depth map that are greater than this recorded value.

Alternatively, processor 24 may dynamically determine the depth value beyond which objects are to be removed from the depth map. For this purpose, it is assumed that the subject in the scene is moving. Therefore, any pixel whose depth does not change over a certain minimum number of frames is assumed to be a background object. Pixels whose depth value is greater than this static depth value are assumed to belong to background objects and are therefore nulled. Initially all of the pixels in the scene may be defined as static, or all of the pixels in the scene may be defined as non-static. In both cases, once the subject begins to move, an actual depth filter can be created dynamically.

Further alternatively, other methods that are known in the art may be used to remove background objects at step 42.

Figure 4A:
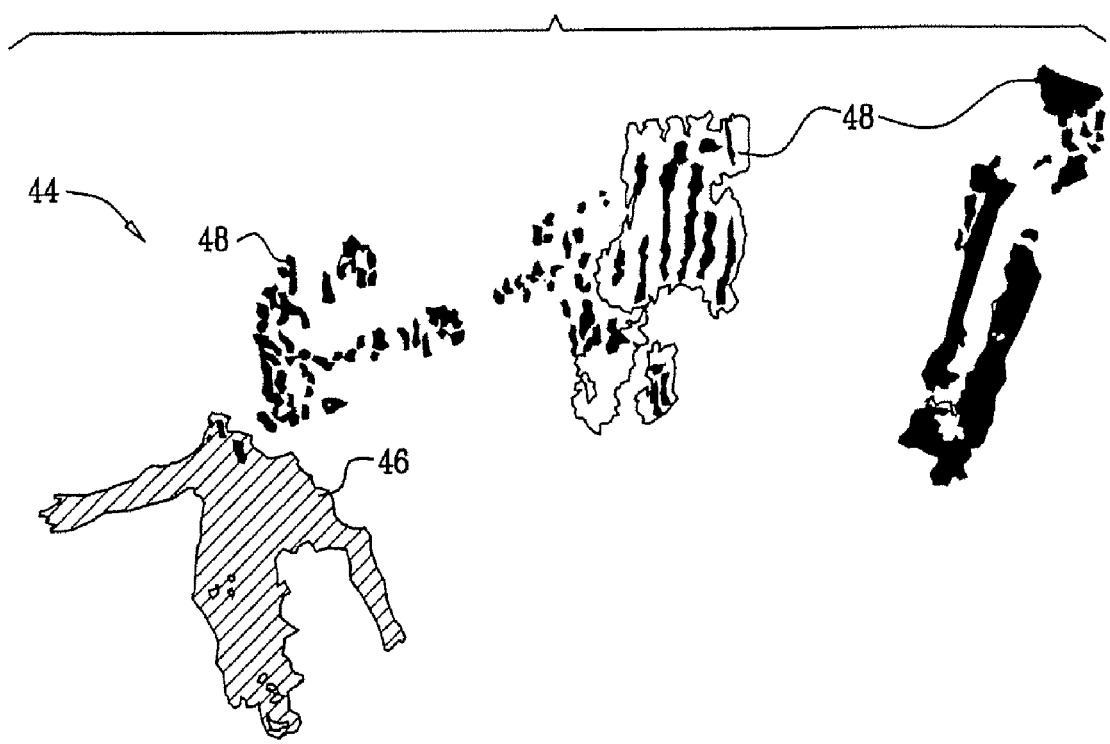
FIGS. 4A and 4B are schematic representations of a depth map before and after removal of background objects, in accordance with an embodiment of the present invention.
Figure 4B:
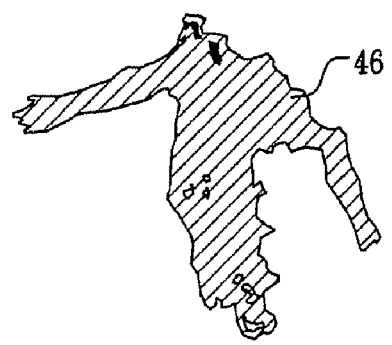

FIGS. 4A and 4B are schematic representations of a depth map 44 before and after removal of background objects, in accordance with an embodiment of the present invention. In FIG. 4A, map 44 comprises a blob 46 corresponding to the body of a human subject along with other blobs 48 corresponding to background objects. The remaining pixel values in map 44 are null. Processor 24 determines that blobs 48 are located at depths that are greater than the depth of blob 46 by at least a certain threshold, which may be determined in the manner described above. Therefore, blobs 48 are removed from the depth map, leaving only blob 46 to be segmented and modeled.

Returning now to FIG. 3, once the background has been successfully removed, processor 24 segments the humanoid forms in the depth map by finding connected components of depth in the depth map. The contours of each connected component of pixels are found at a contour finding step 50. If there are two or more humanoid forms in the depth map that are contiguous with one another (connected by holding hands or touching each other, for example), it is generally necessary for the processor first to separate the forms from one another. In some cases, this sort of separation may be performed using morphological operations or other image analysis techniques. In the description that follows, it is assumed that the depth map contains only one humanoid subject or, alternatively, that separation of connected humanoid forms, if necessary, has been accomplished, so that each humanoid can be represented by a distinct blob.

In order to find the contours of the subject's body at step 50, processor 24 may use methods of edge detection that are known in the art, suitably modified to operate on a depth map. The processor may, in this manner, find not only external contours of the body, but also contours between two parts of the body, for example between an arm and a torso. In one embodiment, the processor uses a two-step thresholding mechanism for this purpose:

1. First, the processor passes over all the pixels in the blob corresponding to the humanoid form, and marks any given pixel as a contour position if it has a valid depth value, and if the difference in depth value between the pixel and at least one of its four connected neighboring pixels (right, left, above and below) is larger then a first threshold. (For this purpose, the difference between a valid depth value and a null value is considered to be infinity)
2. After completing the first step, the processor passes over the blob once again, and marks any pixel (that has not already been marked as a contour position) as a contour position if there is a contour pixel among its eight connected neighboring pixels, and if the difference in depth values between the current pixel and at least one of the remaining connected neighboring positions is larger than a second threshold (lower than the first threshold).

After finding the outer contour of the body, processor 24 identifies the parts of the body, at a sub-segmentation step 52. The purpose of this step is to segment the body into head, torso and limbs, wherein the limbs include arms and legs (assuming they are contained in the area of the depth map).

FIG. 5 is a flow chart that schematically shows details of sub-segmentation step 52, in accordance with an embodiment of the present invention. As a preparatory step for this purpose, processor 24 identifies the longitudinal axis of the body, and then rotates the depth map so that the body contour assumes an upright position, at a rotation step 54. The purpose of this rotation is to simplify computations in the steps that follow, by aligning the longitudinal axis of the body with the Y-coordinate (vertical) axis. Alternatively, the computations described below may be carried out with respect to the longitudinal axis of the body without necessarily performing this rotation, as will be apparent to those skilled in the art.

One method that may be used to find the 3D-axis of the body at step 54 is as follows:
1. Processor 24 down-samples the initial depth map to a grid of nodes that are n pixels apart in each of the X- and Y-directions. The processor computes the depth value of each node based on the depth values in the n×n square centered on the node. The processor sets the node to a null value if more than half the pixels in the square have null values. Otherwise, the node is set to the average of the valid depth values in the n×n square.

2. The processor may further "clean up" this down-sampled depth map based on the values of neighboring nodes at the conclusion of the preceding step: If a majority of the neighbors of given node have null values, then that node is also set to a null value (even if it had a valid depth value after the preceding step).

3. The processor finds the longitudinal axis of the nodes remaining in the down-sampled map. For this purpose, the processor may perform a linear least-squares fit to find the line that best fits the nodes. Alternatively, the processor may fit an ellipsoid around the nodes and find its major axis.

FIG. 6 is a schematic representation of a down-sampled depth map 56 of the body of a humanoid subject, in which a longitudinal 3D-axis 60 of the body is identified, in accordance with an embodiment of the present invention. As explained above, nodes 58 in map 56 have values that are determined by down-sampling the original depth map (after removing background objects if necessary). The nodes that are shown in FIG. 6 are those having non-null depth values. Axis 60 is found by fitting a line to these nodes. Processor 24 finds the angle between this axis and the vertical (Y) axis, and rotates the original depth map to align axis 60 with the vertical.

Returning now to FIG. 5, after rotating the depth map, processor 24 identifies the torso of the body by measuring the thickness of the body contour in directions parallel and transverse to longitudinal axis 60, at a torso identification step 62. For this purpose, the processor may define a bounding box around the body contour (as identified at step 50 and rotated at step 54), and may then binarized the pixel values in the box: Pixels having null depth values are set to zero, while pixels having non-null depth values are set to one. The processor then computes a value of longitudinal thickness for each value of X within the box by summing the binary pixel values along the corresponding vertical line, and computes a value of transverse thickness for each value of Y by summing the binary pixel values along the corresponding horizontal line. The processor applies a threshold to the resulting values in order to identify the vertical and horizontal lines along which the contour is relatively thick.

Figure 7A:
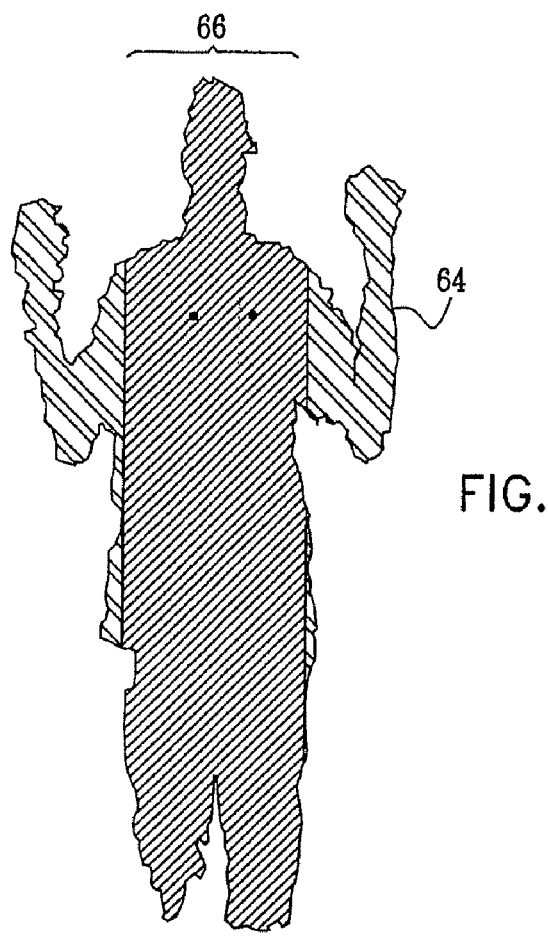
FIG. 7A is a schematic representation of a contour of a body found in a depth map, showing areas in which the longitudinal thickness of the contour exceeds a threshold, in accordance with an embodiment of the present invention.
Figure 7B:
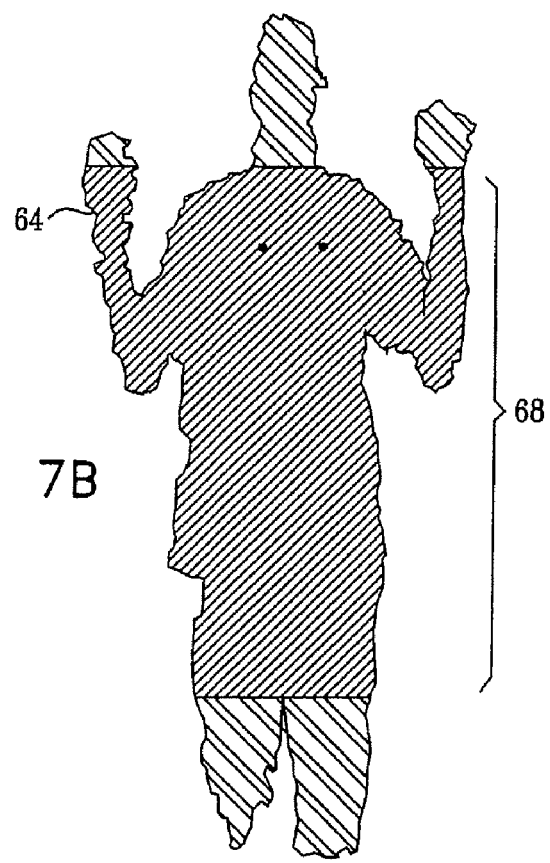
FIG. 7B is a schematic representation of the contour of FIG. 7A, showing areas in which the transverse thickness of the contour exceeds a threshold, in accordance with an embodiment of the present invention.

FIGS. 7A and 7B are schematic representations of a contour 64 of a body found in a depth map, showing areas in which the longitudinal and transverse thicknesses of the contour exceed certain thresholds, in accordance with an embodiment of the present invention. In FIG. 7A, a horizontal region 66 contains the values of X at which the sum of the binary pixel values along the corresponding line exceeds an X-threshold. These are the X-values for which the contour is relatively thick in the longitudinal direction. Similarly, in FIG. 7B, a vertical region 68 contains the values of Y at which the sum of the binary pixel values along the corresponding line exceeds a Y-threshold. The X- and Y-thresholds may be different, and may be determined adaptively by analysis of a histogram of the sums of the binary values along the respective lines.

Figure 7C:
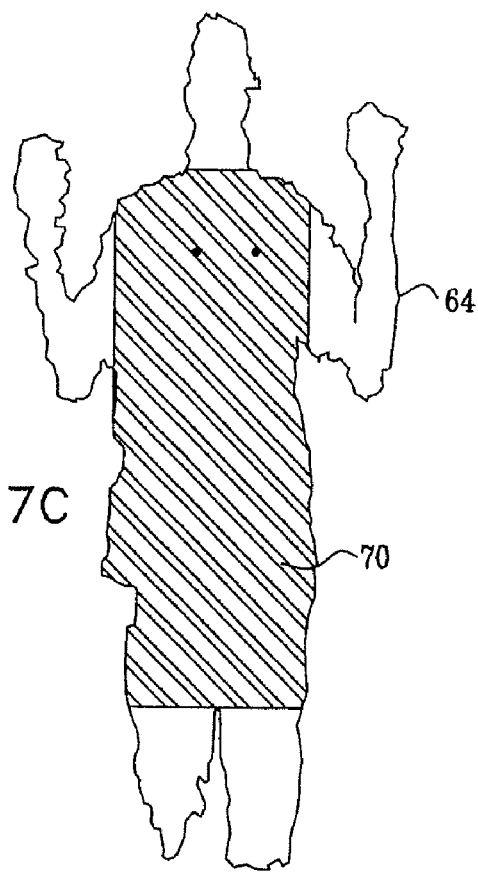
FIG. 7C is a schematic representation of the contour of FIG. 7A, showing the area of the torso of the body as determined by the thicknesses shown in FIGS. 7A and 7B, in accordance with an embodiment of the present invention.

FIG. 7C is a schematic representation of contour 64, showing an area corresponding to a torso 70 of the body, as determined by the thicknesses shown in FIGS. 7A and 7B, in accordance with an embodiment of the present invention.

Processor 24 finds the torso, in this embodiment, simply by taking the intersection of regions 66 and 68, shown in the preceding figures.

Returning now to FIG. 5, once torso 70 has been found, processor 24 can generally identify the head and limbs of the body based on geometrical considerations, at a head and limb identification step 72. The arms are regions connected to the left and to the right of the torso region; the head is the connected region above the torso region; and the legs are the connected regions below the torso region.

In addition, the processor may identify the shoulders preliminarily as the top left and top right corners of the torso region. Should the subject's hands cover one or both of the shoulders, these preliminary identifications could be incorrect. A method for dealing with this sort of overlap is described hereinbelow.

Figure 7D:
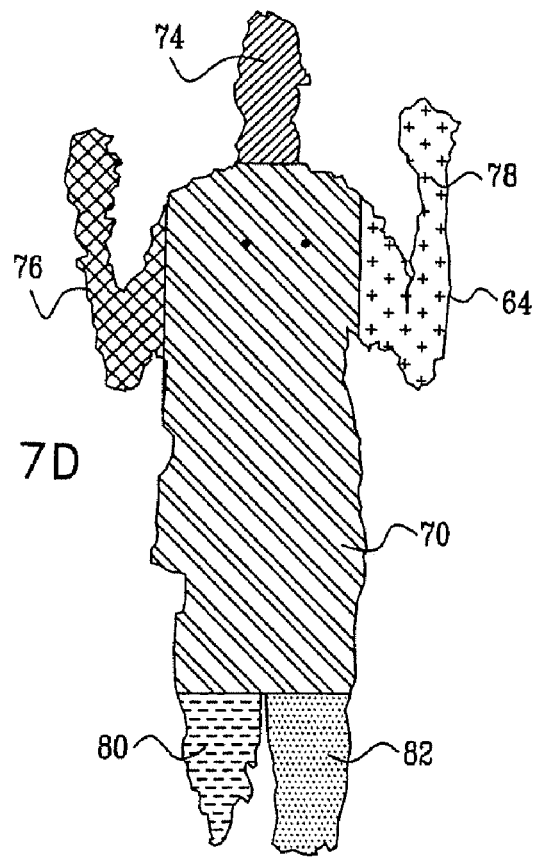
FIG. 7D is a schematic representation of the contour of FIG. 7A, showing the head and limbs as identified based on the torso of FIG. 7C, in accordance with an embodiment of the present invention.

FIG. 7D is a schematic representation of contour 64, showing the result of step 72, in accordance with an embodiment of the present invention. The contour has now been segmented into torso 70, a head 74, right and left arms 76 and 78, and right and left legs 80 and 82. This result has been achieved based solely on depth values provided by the original depth map, without resort to color or luminance information.

Returning once again to FIG. 5, processor 24 optionally determines the "center of mass" of each region of the body, at a center finding step 84. The center of mass of a region in this context refers to a representative depth of that region. For this purpose, for example, the processor may create a histogram of the depth values within the region, and set the depth value with the highest frequency (or an average of two or more values with the highest frequencies) to be the center of mass of the region.

The respective centers of mass of the different regions are particularly useful in differentiating and finding contours between regions that overlap in the depth map, at an overlap identification step 86. For example, when the arm regions fall in front of the torso, the arm regions identified at step 72 will be incomplete, and the torso may be distorted. To complete the shape of the arm, the processor finds pixels within the region of torso 70 whose depth values are far from the center of mass, and which form a connected component adjacent to one of the arm segments. The processor adds this connected component to the arm, along with any remaining contour points between the arm and torso that are connected to the newly-identified arm component.

Figure 8:
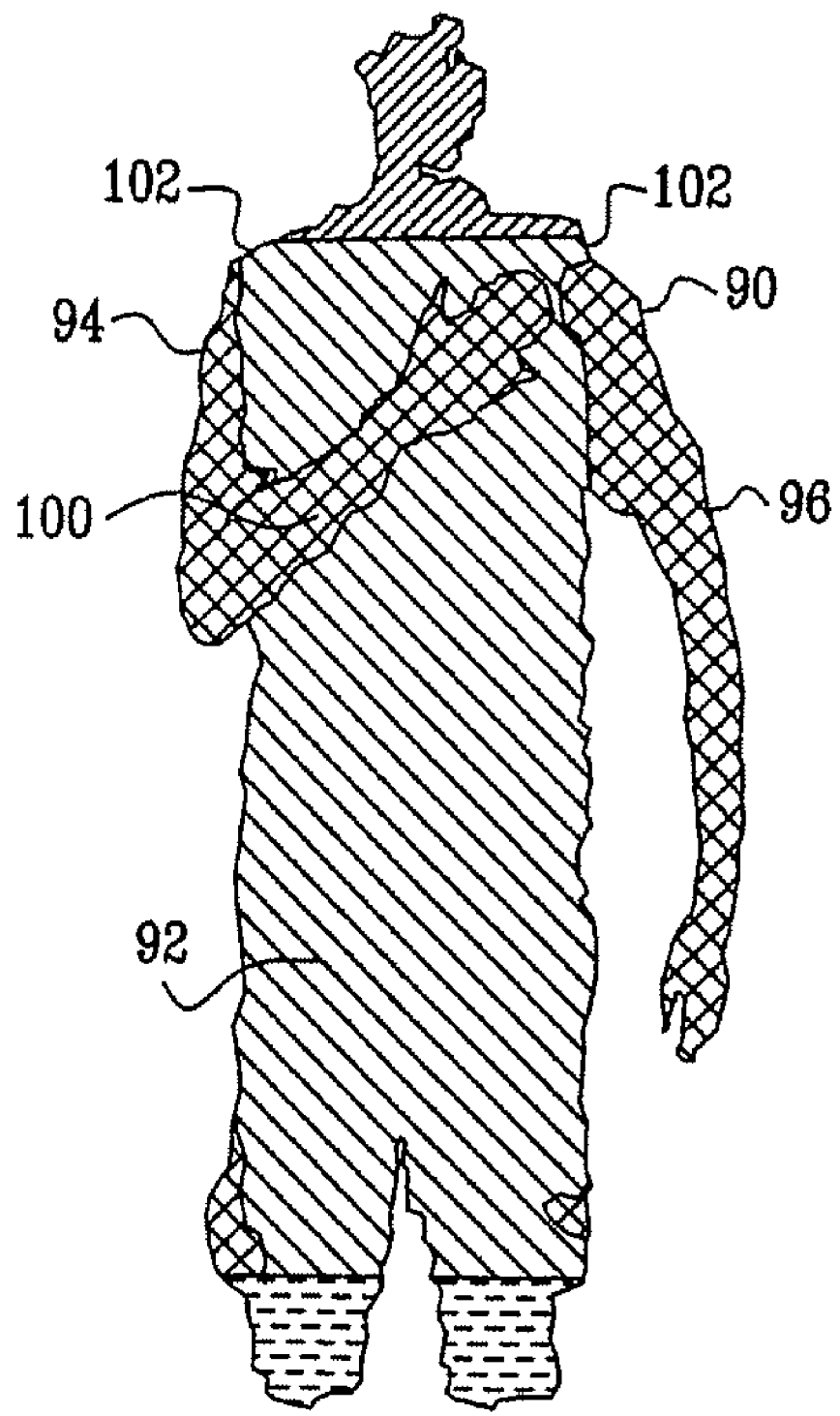
FIG. 8 is a schematic representation of a contour of a body found in a depth map, showing identification of a portion of an arm overlapping the torso, in accordance with an embodiment of the present invention.

Reference is now made to FIG. 8, which is a schematic representation of a contour 90 of a body, exemplifying the operation of step 86, in accordance with an embodiment of the present invention. Processor 24 determines that pixels in a connected component 100 are part of arm 94, which it then connects with arm 94 to complete the definition of the arm.

Once the processor has found the center of mass of the torso, it can find shoulders 102 even when they are overlapped by the subject's arms or hands. For this purpose, the processor models the torso as a rectangle at the center-of-mass depth. The shoulders are located at the upper right and left corners of the rectangle.

Returning now to FIG. 3, after identifying the torso and limbs, processor 24 generates a "stick-figure" model of the subject's body. A number of different methods may be used for this purpose. In the present embodiment, the processor begins by finding the medial axes of the limbs, at an axis identification step 104. In order to find the medial axis of a component of the depth map, such as an arm, the processor surrounds the component with null values and iteratively removes pixels from the component. In one embodiment the processor removes the pixels by successive steps of morphological erosion until the contour points on either side of the component meet. In each iteration of the erosion procedure, the processor sets the contour points to null depth values, and thus creates a new, narrower contour just inside the previous contour. Contour points are considered to have met when they have more than two neighbors that are also contour points. When two contour points meet in this fashion, they are replaced by a final medial axis point. In another embodiment (which may be more efficient computationally), the contour pixels of the depth component are successively peeled off until two contour pixels from either side of the component meet.

The processor typically continues in this manner until it has defined the entire medial axis. Alternatively, the erosion or peeling operations may stop after a certain number of iterations. Further alternatively or additionally, points may be defined as "medial axis points" only starting after a certain number of iterations in order to avoid creating spurious medial axis points. These points may occur particularly in parts of the depth map in which the opposite edges of the arm are initially close to one another.

Figure 9:
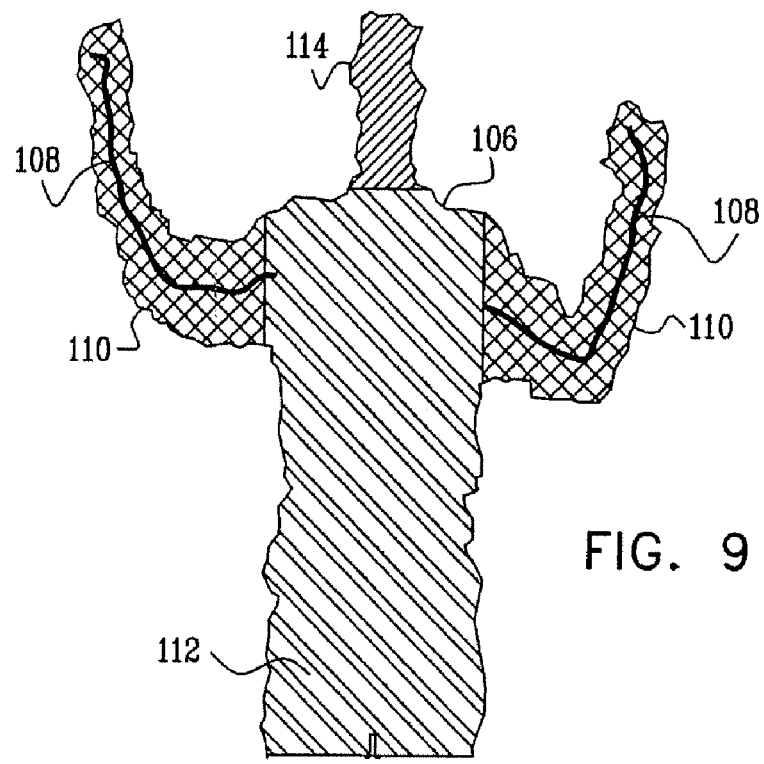
FIG. 9 is a schematic representation of a contour of a body found in a depth map, showing identification of the medial axes of the arms, in accordance with an embodiment of the present invention.

FIG. 9 is a schematic representation of a contour 106 of a body found in a depth map, showing medial axes 108 of arms 110 as identified at step 104, in accordance with an embodiment of the present invention. The processor may similarly find medial axes of a torso 112 and head 114, as well as the legs (not shown in this figure), using the method described above. Although axes 108 are represented in the figure as two-dimensional curves in the plane of the figure, processor 24 actually models medial axes 108 of arms 110 (and of other parts of the body) as three-dimensional curves in space. In other words, each point on the medial axes has x, y, and depth coordinates.

Referring back to FIG. 3, after identifying the points on the medial axes, processor 24 converts these unordered points into "anatomical" stick-figure segments, in order to model the stance and movement of the subject as a stick figure, at a segment modeling step 114. Each arm is thus represented by two stick-figure segments, the first from the shoulder to the elbow and the second from the elbow to the palm. For this purpose, the processor may, for example, first generate a set of long, straight segments, and then use these segments in creating the stick-figure model.

To generate the long segments, processor 24 chooses a first point on the medial axis (typically an end point), finds a second point on the medial axis at a predetermined radius from the first point, and then marks all other points within the radius as "done." The processor repeats this procedure at the second point, to find a third point on the medial axis at the predetermined radius on the other side of the second point. If the line connecting the first and second points and the line connecting the first and third points have similar slopes, the processor marks the second point as done and replaces the entire range between the first and third points with a single straight segment. On the other hand, if the slopes of these lines differ by more than a predetermined tolerance, then the segment between the first and second points is closed, and the processor begins a new line at the second point.

This procedure continues until the processor has traversed all the points on the medial axis and incorporated them in long straight segments that are relatively close to the medial axis found at step 104. Again, the processor defines these segments in three-dimensional (x, y, depth) space. To complete the reconstruction of the body as a stick figure, processor 24 then replaces these segments with two long three-dimensional directional "anatomical" segments, corresponding to the actual, jointed parts of the limbs, one segment from the shoulder to the elbow and the second segment from the elbow to the palm.

Figure 10:
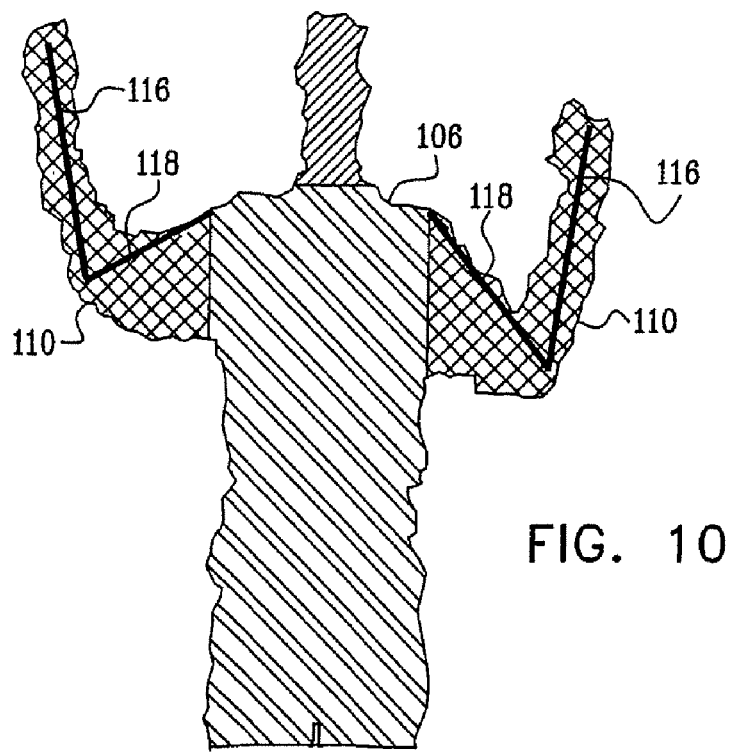
FIG. 10 is a schematic representation of a contour of a body found in a depth map, showing a stick-figure model of the arms derived from the depth map, in accordance with an embodiment of the present invention.

FIG. 10 is a schematic representation of a part of the stick-figure model that processor 24 derives from contour 106 at step 114, in accordance with an embodiment of the present invention. In this example, the processor replaces each arm 110 with two long segments: a forearm segment 116 from the palm to the elbow, and an upper arm segment 118 from the elbow to the shoulder.

To find the elbow, thereby forming two long stick-figure segments in a given arm, processor 24 uses two points (shoulder and palm), two lengths (upper arm and forearm), and one of the long segments mentioned above. The shoulder and palm may have been found previously or may be identified in the course of this step. A method for locating the shoulders was described previously. The palm may be identified as the opposite end of the medial axis from the shoulder or as the point on the medial axis that is farthest from the body center, along the medial axes, and may have the lowest depth value. The lengths of the upper arm and forearm may be given or may be learned. For example, the processor may make an initial estimate of these lengths based on the lengths and orientations of the long segments corresponding to the arm.

Using the above information, processor 24 defines two spheres, with respective centers at the shoulder point and at the palm point, and with respective radii equal to the lengths of the upper arm and forearm. The intersection of these spheres is a circle in 3D space, C. Processor 24 then selects a starting segment from among all the long, straight segments in the region of the arm in question. Typically, the starting segment is the longest segment that is adjacent either to the palm of the hand or to the shoulder and is directed through the palm or shoulder.

Processor 24 locates the elbow by extending the starting segment from the selected end point (palm or shoulder) towards the intersection circle, C. The point on C that is closest to the intersection between this extended segment and the plane going through C, is identified as the elbow. The processor extends a second line from the elbow to the other end point of the medial axis. If a sufficient fraction of the points on the medial axis fall within a predetermined radius of segments 116 and 118 that are found in this manner, the processor then concludes that the arm has been modeled accurately. Otherwise, the processor concludes that the modeled component is not the subject's arm.

Alternatively, the processor may use other methods in order to derive stick-figure segments from the contours of the component. For this purpose, the processor typically attempts to identify a long segment going towards the direction either of the shoulder or of the palm. For example, the long segments corresponding to the arm may be derived by applying the steps described above to the entire connected component, and not only to the medial axis points. The processor uses circles with larger radii and keeps segments that are long. The processor replaces short segments with quickly changing slopes with longer segments. The longer segments are ended only when there is a major slope change. The processor in effect prunes the component points to construct long segments. Again the stick figure (segments 116 and 118) are formed using the shoulder and palm points, upper are and forearm lengths, and the one long segment currently formed, as above.

Another method to create one long segment (to be used with the shoulder and palm points and the two lengths) is to begin with an initial point in the arm blob, either at the shoulder (or the closest point in the arm component to the shoulder point) or at the palm point. Two circles with different radii are then formed around the chosen point. The circles cross the component twice near the center point, thus forming an angle between the two intersections with the center point of the circle as the common point. There are two angles, one for each circle. These angles are bisected, and for each circle the intersection of the bisector and the circle is retained. These two points are connected and this line is representative of the component. The length of the segment is the difference between the two radii, and the segment always points in the direction of either the shoulder or the palm. This segment, in conjunction with the shoulder and palm points and the upper arm and forearm lengths, can be used to form stick-figure segments 116 and 118, as mentioned above.

Although steps 104 and 114 are described above, for the sake of clarity, with reference to arms 110, similar steps may be performed in order to find the stick-figure segments that model the legs, torso and head, as well. A generic stick figure, with predefined kinematic properties, may then be fitted to this model in order to complete the analysis of the subject's stance, gestures and other motions. The fit may be performed using an optimizing technique to minimize the distance between possible positions of the kinematic stick-figure model and the segments of the model that is derived from the depth map. Once the processor has found a good fit in an initial frame, it can use the possible motions of the kinematic model to initialize the segment-finding procedure in each successive frame. The actual segment positions that are found in each frame are then used to update the position of the kinematic model.

The processor may use the motion of the stick figure as a control input to a computer application. For example, gestures of the stick figure may be used to interact with user controls that appear on the computer screen or in a virtual reality display. As another example, the motions of the stick figure may be reflected in motion of a 3D avatar or virtual 3D body of a character in a game or other interactive application.

In summary, as described above, processor 24 uses the depth map to form a stick figure with physical and kinematic behavior and with geometrical constraints. Once the stick figure has been initiated, it can aid in subsequent human body segmentation by identifying the depth surface for the body components in subsequent frames.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A computer-implemented method for processing data, comprising:

receiving a depth map of a scene containing a body of a humanoid subject, the depth map comprising a matrix of pixels, each pixel corresponding to a respective location in the scene and having a respective pixel value indicative of a distance from a reference location to the respective location;

segmenting the depth map so as to find a contour of the body;

processing the contour in order to identify a torso and one or more limbs of the subject by:

identifying an axis of the body in the depth map;

computing a transverse thickness of the contour along multiple first lines perpendicular to the axis;

computing a longitudinal thickness of the contour along multiple second lines parallel to the axis;

designating as the torso a part of the area within the contour that is defined by the first and second lines along which the transverse thickness and longitudinal thickness are no less than a specified transverse threshold and longitudinal threshold, respectively; and identifying a second part of the area that is connected to the torso as at least one of the limbs; and generating an input to control an application program running on a computer by analyzing a disposition of at least one of the identified limbs in the depth map.

2. The method according to claim 1, wherein receiving the depth map comprises acquiring the depth map without affixing any dedicated marker to the body.

3. The method according to claim 1, wherein receiving depth map comprises acquiring the depth map using a single, stationary imaging device.

4. The method according to claim 3, wherein acquiring the depth map comprises projecting an uncorrelated pattern of spots onto the subject, capturing an image of the projected pattern using the imaging device, and processing the image in order to generate the depth map.

5. The method according to claim 4, wherein projecting the uncorrelated pattern of spots comprises forming a primary speckle pattern using a coherent light source.

6. The method according to claim 1, wherein receiving the depth map comprises acquiring a sequence of depth maps at a frame rate of at least 25 frames/sec, and wherein generating the control input comprises updating the control input, responsively to the sequence of depth maps, at an update rate that is equal at least to the frame rate.

7. The method according to claim 1, wherein segmenting the depth map comprises identifying a background object in the scene that is not connected to the body, and removing the background object from the scene prior to finding the contour.

8. The method according to claim 1, wherein identifying the second part of the area comprises determining, based on the depth map, a representative distance of the torso from the reference location, and identifying as an arm of the subject a region overlying the torso in which the distance of the pixels is less than the representative distance.

9. The method according to claim 1, wherein analyzing the disposition comprises finding one or more respective medial axes of the one or more limbs.

10. The method according to claim 9, wherein finding the one or more respective medial axes comprises iteratively removing the pixels from at least one of the limbs.

11. The method according to claim 9, wherein the medial axes are curved, and wherein analyzing the disposition comprises deriving stick-figure representations of the one or more limbs by finding straight segments that fit the medial axes.

12. The method according to claim 1, wherein the one or more limbs comprise an arm of the subject, wherein analyzing the disposition comprises deriving a stick-figure representation of the arm by identifying a shoulder point on the torso and a palm point on the arm, and identifying two straight segments that pass through the shoulder and palm points, respectively, and meet at an elbow of the arm.

13. Apparatus for processing data, comprising:

an imaging device, which is configured to capture an image of a scene containing a body of a humanoid subject; and a processor, which is coupled to process the image so as to create a depth map, which comprises a matrix of pixels, each pixel corresponding to a respective location in the scene and having a respective pixel value indicative of a distance from a reference location to the respective location, and which is configured to segment the depth map so as to find a contour of the body, to process the contour in order to identify a torso and one or more limbs of the subject, and to generate an input to control an application program running on a computer by analyzing a disposition of at least one of the identified limbs in the depth map, wherein the processor is configured to identify the torso and the one or more limbs by identifying an axis of the body in the depth map, computing a transverse thickness of the contour along multiple first lines perpendicular to the axis, computing a longitudinal thickness of the contour along multiple second lines parallel to the axis, designating as the torso a part of the area within the contour defined by the first and second lines along which the transverse thickness and longitudinal are no less than a specified transverse threshold longitudinal threshold, respectively, and identifying a second part of the area that is connected to the torso as at least one of the limbs.

14. The apparatus according to claim 13, wherein the processor is configured to create the depth snap without any dedicated marker having been affixed to the body.

15. The apparatus according to claim 13, wherein the processor is configured to create the depth map using a single, stationary imaging device.

16. The apparatus according to claim 15, wherein the imaging device is configured to project an uncorrelated pattern of spots onto the subject, and to capture the image of the projected pattern.

17. The apparatus according to claim 16, wherein the uncorrelated pattern of spots comprises a primary speckle pattern formed by a coherent light source.

18. The apparatus according to claim 13, wherein the processor is configured to generate a sequence of depth maps at a frame rate of at least 25 frames/sec, responsively to images captured by the imaging device, and to update the control input, responsively to the sequence of depth maps, at an update rate that is equal at least to the frame rate.

19. The apparatus according to claim 13, wherein the processor is configured to identify a background object in the scene that is not connected to the body, and to remove the background object from the scene prior to finding the contour.

20. The apparatus according to claim 13, wherein the processor is configured to determine, based on the depth map, a representative distance of the torso from the reference location, and to identify as an arm of the subject a region overlying the torso in which the distance of the pixels is less than the representative distance.

21. The apparatus according to claim 13, wherein the processor is configured to analyze the contour so as to find one or more respective medial axes of the one or more limbs.

22. The apparatus according to claim 21, wherein the processor is configured to find the one or more respective medial axes by iteratively eroding the contour surrounding at least one of the limbs.

23. The apparatus according to claim 21, wherein the medial axes are curved, and wherein the processor is configured to derive stick-figure representations of the one or more limbs by finding straight segments that fit the medial axes.

24. The apparatus according to claim 13, wherein the one or more limbs comprise an arm of the subject, and wherein the processor is configured to derive a stick-figure representation of the arm by identifying a shoulder point on the torso and a palm point on the arm, and identifying two straight segments that pass through the shoulder and palm points, respectively, and meet at an elbow of the arm.

25. A computer software product, comprising a non-transitory computer-readable medium in which program instructions are stored, which instructions, when read by a computer, cause the computer to acquire a depth map of a scene containing a body of a humanoid subject, the depth map comprising a matrix of pixels, each pixel corresponding to a respective location in the scene and having a respective pixel value indicative of distance from a reference location to the respective location, and to segment the depth map so as to find a contour of the body, to process the contour in order to identify a torso and one or more limbs of the subject, and to generate an input to control an application program running on a computer by lysing a disposition of at least one of the identified limbs in the depth map, wherein the instructions cause the computer to identify the torso and the one limbs by identifying an axis of the body in the depth map, computing a transverse thickness of the contour along multiple first lines perpendicular to the axis, computing a longitudinal thickness of the contour along multiple second lines parallel to the axis designating as the torso a part of the area within contour that is defined by the first and second lines along which the transverse thickness and longitudinal thickness are no less than a specified transverse threshold and longitudinal threshold, respectively, and identifying a second part of the area that is connected to the torso as at least one of the limbs.

26. The product according to claim 25, wherein the instructions cause the computer to create the depth map without any dedicated marker having been affixed to the body.

27. The product according to claim 25, wherein the instructions cause the computer to create the depth map using a single, stationary imaging device.

28. The product according to claim 27, wherein an uncorrelated pattern of spots is projected onto the subject, and wherein the instructions cause the computer to create the depth map by processing an image of the projected pattern.

29. The product according to claim 28, wherein the uncorrelated pattern of spots comprises a primary speckle pattern formed by a coherent light source.

30. The product according to claim 25, wherein the instructions cause the computer to generate a sequence of depth maps at a frame rate of at least 25 frames/sec, and to update the control input, responsively to the sequence of depth maps, at an update rate that is equal at least to the frame rate.

31. The product according to claim 25, wherein the instructions cause the computer to identify a background object in the scene that is not connected to the body, and to remove the background object from the scene prior to finding the contour.

32. The product according to claim 25, wherein the instructions cause the computer to determine, based on the depth map, a representative distance of the torso from the reference location, and to identify as an arm of the subject a region overlying the torso in which the distance of the pixels is less than the representative distance.

33. The product according to claim 25, wherein the instructions cause the computer to analyze the contour so as to find one or more respective medial axes of the one or more limbs.

34. The product according to claim 33, wherein the instructions cause the computer to find the one or more respective medial axes by iteratively eroding the contour surrounding at least one of the limbs.

35. The product according to claim 33, wherein the medial axes are curved, and wherein the instructions cause the computer to derive stick-figure representations of the one or more limbs by finding straight segments that fit the medial axes.

36. The product according to claim 25, wherein the one or more limbs comprise an arm of the subject, and wherein the instructions cause the computer to derive a stick-figure representation of the arm by identifying a shoulder point on the torso and a palm point on the arm, and identifying two straight segments that pass through the shoulder and palm points, respectively, and meet at an elbow of the arm.

* * * * *

UNITED STATES PATENT AND TRADEMARK OFFICE
CERTIFICATE OF CORRECTION

PATENT NO. : 8,249,334 B2
APPLICATION NO. : 12/300086
DATED : August 21, 2012
INVENTOR(S) : Tamir Berliner et al.

Page 1 of 1

It is certified that error appears in the above-identified patent and that said Letters Patent is hereby corrected as shown below:

In the Claims, Column 15, Claim 13, line 16, please delete "contour" and insert --contour that is--.

Column 15, Claim 13, line 17, please insert --thickness-- after the word "longitudinal".

Column 15, Claim 13, line 18, please delete "threshold" and insert --threshold and--.

Column 15, Claim 14, line 22, please delete "snap" and insert --map--.

Column 16, Claim 25, line 13, please delete "lysing" and insert --analyzing--.

Column 16, Claim 25, line 16, please delete "one" and insert --one or more--.

Column 16, Claim 25, line 21, please delete "axis" and insert --axis,--.

Column 16, Claim 25, line 22, please delete "within" and insert --within the--.

Signed and Sealed this
Fifteenth Day of January, 2013

David J. Kappos
*Director of the United States Patent and Trademark Office*